Figure 1:
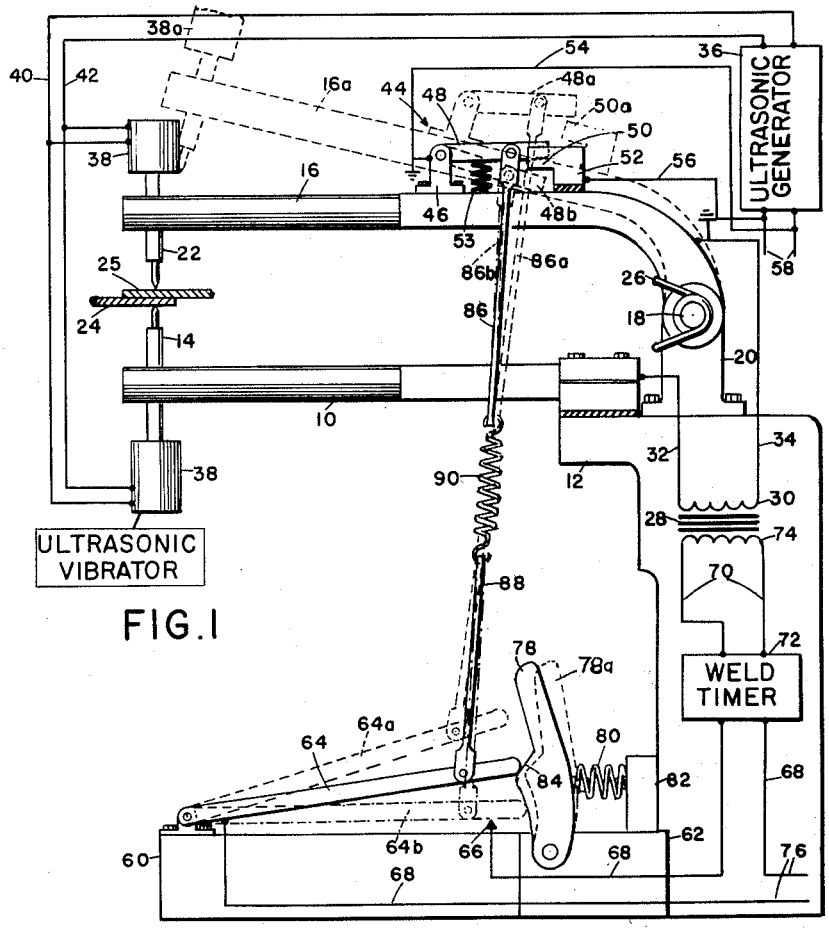

INVENTOR.
Ronald F. Brennen.
James A. Bucci.
BY
ATTORNEY.

United States Patent Office

2,847,556
Patented Aug. 12, 1958

2,847,556

METHOD AND APPARATUS FOR BREAKING UP OXIDE ON, AND WELDING, METAL

Ronald F. Brennen and James A. Bucci, Brooklyn, N. Y., assignors to Welding Industry Research & Patent Corporation, New York, N. Y., a corporation of New York Application September 7, 1956, Serial No. 608,546

3 Claims. (Cl. 219—86)

This invention relates to a novel method and means for conditioning oxidized metal for welding and more particularly to methods and apparatus and devices for breaking up oxide or aluminum or other metals preparatory to electric welding, though it is noted that in some of the claims the invention is not limited to metals or welding.

Objects of the invention are to provide an instantaneous method of preparing metal for welding and to provide a method and device or apparatus of this kind which effectually breaks up oxides on aluminum or other metals, at the place to be welded, preparatory for the welding current at said place to complete the weld.

Other objects of the invention are to eliminate liquid cleaning of the metal and the time factors involved and to provide a single method and device of this kind which disintegrates the oxide on the metal by vibrating welding electrodes at the place where welding is to be made and then applying welding current to the same electrodes while the electrodes are still at said same place.

Additional objects of the invention are to effect simplicity and efficiency in such methods and apparatus and to provide an extremely simple device or apparatus of this kind which is durable and reliable in operation, and economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are disclosed herein in connection with an oxide disintegrating and welding assembly which briefly stated, includes a movable holder carrying a movable electrode movable toward and biased from a fixed electrode. An ultrasonic vibrator mounted fast on each electrode is vibrated by current of an electric supply circuit supplying ultrasonic frequency current to the vibrators. A knife switch in said circuit comprises contact jaws mounted on and spaced from and insulated from the holder and a blade hinged on and biased from said holder and movable through the space between said jaws. A foot pedal member when moved to an intermediate position operates a connector to move and stop the blade between the jaws to complete said circuit and vibrate the electrodes and press the vibrating electrodes lightly upon the work pieces to break up the oxide, after which the pedal member is moved to a lower position to draw the switch blade beneath the jaws onto the holder and cause the holder to press the movable electrode to the work piece with a pressure suitable for welding. Electric means set in operation by the foot pedal in the lower position applies welding current to the electrodes.

Figure 2:
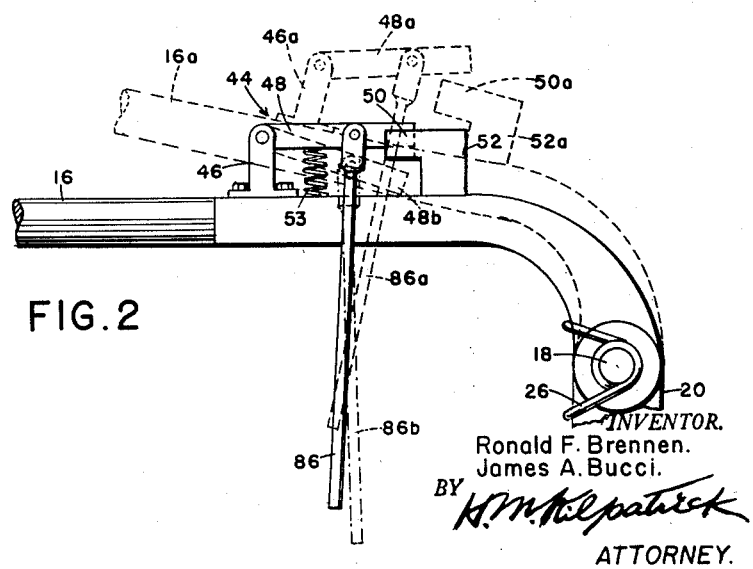

In the accompanying drawing showing, by way of example, one of many possible embodiments of the invention, Fig. 1 is a partly diagrammatic side elevation of the assembly, and Fig. 2 is a fragmental side elevation on a larger scale showing the knife switch and associated parts.

Our oxide breaking-up or disintegrating and welding assembly comprises a fixed electrode holder 10 mounted on and insulated from a fixed support 12 and carrying a fixed electrode 14, and a grounded movable electrode holder 16 hinged at its inner end on a hinge pin 18 mounted in a fulcrum block 20 on said support 12, the holder 16 carrying a movable electrode 22 movable toward and from work pieces 24, 25 placed on the fixed electrode. A coiled spring 26 wound around said pin and having its ends anchored on said movable holder and fulcrum block is wound and positioned and strong enough to cause the spring to normally yieldably hold the holder 16 raised in the position of the dotted lines 16a.

A transformer 28 has the ends of its secondary 30 connected by conductors 32, 34 to said holders respectively to supply welding current to said electrodes, as will be explained.

An ultrasonic electric generator 36 of a suitable frequency, for instance 25 kilocycles per second transmits its current to ultrasonic vibrators 38 mounted fast on electrodes 14, 22 respectively, through electric conductors 40, 42 connecting the generator with the electrodes.

Current to the generator is controlled by a switch 44 comprising a hinge member 46 mounted and grounded on an intermediate part of the movable holder 16 and carrying a switch blade 48 having its inner end hinged on said hinge member, and its free end engageable between a projecting pair of spring contact jaws 50 of a contact member 52 mounted on and insulated from the movable holder 16. The jaws 50 project toward the hinge member 46 and are spaced from the movable holder to allow the blade to pass to, between and below the jaws to the position 48b to make and break contact with the jaws. Conductors 54, 56 connected to said generator, hinge member and contact jaws connect the generator and switch in series with a suitable source of current as at 58 to supply current to the generator.

A weak spring 53 is compressed between the blade and movable holder to normally yieldably hold the blade raised above the jaw parts as shown by the dotted lines 48a, 50a, the weak spring being strong enough to force down the movable holder against the action of the coiled spring 26 when the switch blade is forced down, as will be explained.

A foot switch base 60 having a rear projection 62 carries a foot switch movable pedal member 64 pivoted to the front end of said base and having an upper position shown by dotted lines 64a, an intermediate position shown by the full lines and a lower position 64b. A fixed contact 66 is engaged by said movable pedal member when in lower position 64b. Conductors 68, 70 connecting a weld timer 72 between the foot switch, the primary 74 of the transformer, and a suitable source of current as at 76 supply primary current to the transformer when the contact 66 is engaged.

A stop member 78 pivoted on the side of said rear projection 62 and engageable with the free edge of the pedal member 64 is engaged by a compression spring 80 compressed between a post 82 on said rear projection 62 and the stop member 78 and presses against the pedal member 64, said stop member being provided with an intermediate cam shoulder 84 engageable with the pedal member when in said intermediate position to yieldably stop the pedal member in the intermediate position for a purpose which will appear.

A connector 86, 88, 90 connecting the foot switch movable member to the intermediate part of the switch blade comprises upper and lower sections 86, 88 and interposed therebetween the strong spring 90 strong enough to overcome the force of the coiled spring 26 and the weak spring 53, when the pedal member is moved to the lower position 64b. The weak spring 53 is of such strength and strength that when the pedal member 64 is moved to and yieldably stopped in the intermediate solid line position against the cam shoulder 84, the movable holder 16 will be moved to its solid line position to bring the movable electrode 22 to press on the upper work piece 24 and the switch blade will be moved and stopped between the contact jaws 50 to close the circuit to energize the generator 36 and vibrate the electrodes, and the electrodes will press upon the upper work piece with a light squeeze, which may be maintained for about one to ten seconds depending upon the amount of oxide and the surface condition and thickness and inertia of the work pieces, thereby breaking up the oxide and preparing the surface for welding, after which the pedal member is pressed upon with sufficient force to move the stop member 78 to the dotted position 78a, and the pedal member is moved to the lower position 64b, pulling the switch blade from and beneath the jaws to the position 48b against the holder, breaking the circuit to the generator 36 and pressing the electrodes to the work pieces with a pressure determined by the strong spring 90 whereupon contact is made by the pedal member with the fixed contact 66 and current is supplied to the primary 74, and the secondary will supply welding current to the electrodes a length of time determined by the timer 72. Thereupon the pedal member may be released and allow the pedal member, the movable holder and the switch blade to rise to their upper position 64a, 16a, and 48a under the influence of the coiled spring 26 and the weak spring 53.

We claim as our invention:

1. An oxide breaking and welding assembly comprising a fixed electrode; a movable holder carrying a movable electrode movable toward the fixed electrode; a yieldable spring to urge movable electrode from the fixed electrode; an ultra-sonic vibrator mounted fast on each electrode; means including an electric supply circuit to supply ultrasonic frequency current to the vibrators; a switch in said circuit comprising a blade hinged on said holder and contact jaws mounted on and insulated from the holder through which jaws the blade may pass; a weak spring to urge the blade from the holder and jaws; a foot switch comprising a pedal member having upper, intermediate and lower positions and a fixed contact engaged by said pedal member when in lower position; electrical supply means connected to the electrodes and the foot switch to supply welding current to the electrodes; a connector connecting the pedal member to the switch blade; the weak spring being of such strength and the connector being of such length that when the pedal member is in the intermediate position the switch blade will move and stop between the jaws and the movable electrode will press lightly upon the work piece, and when the pedal member is moved to the lower position the switch blade will move beneath the jaws.

2. In combination, a fixed electrode; a movable holder carrying a movable electrode movable toward and biased from the fixed electrode; an ultrasonic vibrator mounted fast on each electrode; an electric supply circuit to supply ultrasonic frequency current to the vibrators; a knife switch in said circuit comprising contact jaws mounted on and spaced and insulated from the holder and a blade hinged on and biased from said holder movable downwardly through said jaws; a foot pedal member; and means operated by said pedal member when moved to an intermediate position to move the blade downwardly into contact with and between the jaws and press the movable electrode lightly upon the work piece, and when the pedal member is moved to a lower position to draw the switch blade beneath the jaws and open said circuit and cause the holder to press the movable electrode to the work piece with a pressure suitable for welding; and means for substantially detaining the blade at contacting position between the jaws when the pedal member is in said intermediate position.

3. An oxide disintegrating and welding assembly comprising a fixed electrode; a movable holder carrying a movable electrode movable toward and biased from the fixed electrode; an ultrasonic vibrator mounted fast on at least one electrode; an electric supply circuit for the vibrator; a switch in said circuit comprising a blade hinged on said holder and turnable in on direction from open-to-closed-to-open positions; a foot pedal member; means operated by said pedal member when moved to an intermediate position to move the switch from open to closed position and press the movable electrode lightly upon the work piece, and when the pedal member is moved to a lower position to move the switch further to the second open position and cause the holder to press the movable electrode to the work piece with a pressure suitable for welding; and means operated by the foot pedal in a still lower position to apply welding current to the electrodes.

References Cited in the file of this patent

UNITED STATES PATENTS

| | | |
|---|---|---|
| 1,164,634 | Eveland | Dec. 21, 1915 |
| 1,196,613 | Taylor | Aug. 29, 1916 |
| 2,014,082 | Fox | Sept. 10, 1935 |
| 2,222,906 | Hentzen | Nov. 26, 1940 |
| 2,432,750 | Goldsworthy | Dec. 16, 1947 |
| 2,435,577 | Dawson | Feb. 10, 1948 |

FOREIGN PATENTS

| | | |
|---|---|---|
| 251,946 | Switzerland | Nov. 30, 1947 |